(12) United States Patent
Bernacchi

(10) Patent No.: US 9,314,032 B2
(45) Date of Patent: Apr. 19, 2016

(54) 0-NET CARBOHYDRATE ALL PURPOSE FLOUR

(71) Applicant: Peter Jay Bernacchi, Littleton, CO (US)

(72) Inventor: Peter Jay Bernacchi, Littleton, CO (US)

( * ) Notice: Subject to any disclaimer, the term of this patent is extended or adjusted under 35 U.S.C. 154(b) by 135 days.

(21) Appl. No.: 13/874,982

(22) Filed: May 1, 2013

(65) Prior Publication Data

US 2014/0161963 A1 Jun. 12, 2014

Related U.S. Application Data

(60) Provisional application No. 61/797,460, filed on Dec. 7, 2012.

(51) Int. Cl.
| | | |
|---|---|---|
| *A21D 2/36* | (2006.01) | |
| *A21D 2/18* | (2006.01) | |
| *A21D 2/26* | (2006.01) | |
| *A21D 13/06* | (2006.01) | |

(52) U.S. Cl.
CPC *A21D 2/36* (2013.01); *A21D 2/183* (2013.01); *A21D 2/26* (2013.01); *A21D 13/062* (2013.01); *A21D 13/066* (2013.01)

(58) Field of Classification Search
CPC .................................. A23L 1/29; A23L 1/296
See application file for complete search history.

(56) References Cited

U.S. PATENT DOCUMENTS

| | | | |
|---|---|---|---|
| 4,961,937 A * | 10/1990 | Rudel | 426/19 |
| 2006/0003070 A1* | 1/2006 | Muller-Thym, Jr. | 426/549 |
| 2008/0003265 A1* | 1/2008 | Casey et al. | 424/439 |

OTHER PUBLICATIONS

Carpender, Dana, "DeCarbing Strategy #2 Part 3? Part 4?"—Hold the Toast, http://holdthetoast.com/content/de-carbing-strategy-2-part-3-part4, Oct. 26, 2010.*
Of Osilesi et al., "Use of xanthan gum in dietary management of diabetes mellitus"—The American Journal of Clinical Nutrition, 42, Oct. 1985, pp. 597-603.*

* cited by examiner

*Primary Examiner* — Elizabeth Gwartney
(74) *Attorney, Agent, or Firm* — Kenyon & Kenyon LLP

(57) ABSTRACT

A 0-net carbohydrate all-purpose baking flour high in protein and fiber content and low in fat and calorie content. In a preferred embodiment the proteins and fibers are blended together in the presence of a bonding agent. The resulting 0-net carbohydrate baking flour preferably further includes a natural sweetener. The 0-net carbohydrate flour can be prepared so as to be gluten free.

2 Claims, No Drawings

0-NET CARBOHYDRATE ALL PURPOSE FLOUR

CROSS REFERENCE TO RELATED APPLICATION

The present application claims priority to U.S. provisional application Ser. No. 61/797,460 filed Dec. 7, 2012, the disclosure of which is incorporated herein by reference in its entirety.

TECHNICAL FIELD

The present invention relates to the baking industry, and more specifically to baking ingredients which formulate a high protein, 0-net carbohydrate, all-purpose baking flour high in fiber content and low in fat and calorie content.

BACKGROUND OF THE INVENTION

The majority of Americans are raised on a very high carbohydrate diet. They are addicted to white flour based, sweet, high carbohydrate snack foods, such as cookies, pastries, doughnuts, cakes, pies, chips, etc. having a high fat content. They also love high carbohydrate containing staples such as pizza, pasta, bread, rolls, bagels, muffins and the like. Such high carbohydrate, high calorie, high fat, low nutritional foods are readily available in our grocery stores and fast food restaurants, or baked in the home, contributing to overweight and obesity problems. Thus, it would be revolutionary in the baking industry to provide a baking flour that can be used to bake all of those highly desirable and popular commonly baked foods, such as referenced above, eliminating the presence of unhealthy carbohydrates, low in fat and calorie content, while maintaining an appetizing taste and desirable texture. For those consumers who are at risk pertaining to the consumption of gluten, the additional feature of providing a gluten free flour, in addition to the elimination of undesirable carbohydrates, would further distinguish a 0-net carbohydrate flour from those flours presently available.

SUMMARY

Therefore, it is an object of the present invention to provide a new and revolutionary all-purpose baking flour ideal for the general public desiring to maintain a healthy weight and life style, eliminating sugar/carbohydrate highs and lows experienced with traditional refined white flour containing a high content of unhealthy ingredients.

Another object of the present invention is to provide a high protein, 0-net carbohydrate all-purpose baking flour high in fiber content, and low in calorie and fat content.

Still, another object of the present invention is to provide a novel process for the preparation/manufacturing of a high protein 0-net carbohydrate all-purpose baking flour, high in fiber content and low in calorie and fat content.

Yet, another object of the present invention is to provide a 0-net carbohydrate all-purpose flour which excludes the presence of unhealthy ingredients, such as fats and substantially all refined sugar additives, while maintaining the inclusion of natural and wholesome ingredients which produce tasteful and desirably textured baked foods.

A further object of the present invention is to provide an all-purpose gluten free, 0-net carbohydrate baking flour.

Yet, a further object of the present invention is to provide a new and unobvious 0-net carbohydrate all-purpose baking flour high in protein and fiber content, useful in the preparation of deliciously tasteful baked foods, eliminating undesirable calories, fats and unhealthy carbohydrates.

DETAILED DESCRIPTION

The foregoing objects and others are accomplished in accordance with the present invention, generally speaking, by mixing together raw materials of a combination of soluble and/or insoluble fibers and high quality forms of proteins, so as to produce a 0-net carbohydrate all-purpose baking flour high in protein and fiber content, to the exclusion of unwanted fats, calories and unhealthy carbohydrates. Alternatively, in a preferred embodiment of the present invention, the fiber and protein ingredients are blended together in the presence of a bonding agent and ground utilizing a commercial grade grain mill set on a fine mill setting (approximately 212-236 microns), bonding/fusing the proteins to the fibers at a molecular level as a finely milled powder. The resulting protein bonded fibers are preferably blended with a finely ground natural sweetener, which enhances the taste of the 0-net carbohydrate flour while, at the same time, adding negative carbohydrate. Vital wheat gluten may be included as one of the protein additives, either in the initial mixing of the raw materials or in a final blending step to further enhance the negative carbohydrate content. If necessary, the present 0-net carbohydrate flour of the present invention is also capable of being prepared as a gluten free flour. The process of the present invention keeps the protein material from separating from the final baking composition in recipes when liquids are added, while bonding/fusing the balance of the ingredients.

The most common forms of carbohydrates (carbs) are sugar, starches and fibers. Sugar carbs are found in a range of natural foods including milk, fruits, sugar beets and sugar alcohols. Starch carbs are found in all cereal grains as well as starchy foods, such as bread, pasta, rice, potatoes and noodles, as examples. Dietary fiber carbs are found in most plant foods, such as certain fruits and vegetables and whole grain cereals.

The digestive system handles sugar and starch carbs in the same manner such that they are absorbed into the blood stream. Fiber, on the other hand, passes through the body undigested. There are two types of dietary fiber, soluble (dissolves in water) and insoluble (does not dissolve in water). Soluble fiber is found in oatmeal, oat bran, nuts and seeds, most fruits, such as pears, apples, strawberries, and blueberries. Insoluble fiber is found in whole wheat bread, barley, brown rice, couscous, whole grain cereals, wheat bran, most vegetables and some fruits.

Any suitable raw fiber, soluble and/or insoluble, may be utilized in the course of the present invention. Typical insoluble fibers include psyllium fiber/psyllium husk fibers, wheat bran, flax seed meal, corn bran, whole grain cereals, a wheat bran/wheat germ mixture, most vegetables and some fruits. Preferably, the weight ratio of wheat bran to wheat germ in the wheat bran/wheat germ mixture is 1:1. Typical soluble fibers include sesame seeds, apple pectin, most fruits, nuts, oatmeal and oat bran.

Any suitable high quality protein may be used in the course of practicing the present invention. Typical such proteins include whey protein, egg white protein, hemp protein, vital wheat gluten, carbohydrate free vital wheat gluten, almond flour, whole egg protein, egg substitute, soy protein, soy flour, vegetable protein and coconut flour. Gluten is the protein found in wheat. Vital wheat gluten is the gluten protein in powdered form.

Any natural sweetener may be used to enhance the taste and contribute to producing the 0-net carbohydrates in the final baked product. Typical natural sweeteners include sugar alcohols, such as erythritol, xylitol, sorbitol, mannitol and stevia. The natural sweeteners soften the taste of the flour while containing 0-net carbohydrates and zero calories.

When utilizing bonding agents in the process of formulating the 0-net carbohydrate flour any suitable binder may be used in the milling/grinding process. Typical such bonding agents include xanthan gum and guar gum as representative examples.

The amounts of the various ingredients of the 0-net carbohydrate flour of the present invention, used in combination, will vary depending upon the specific nature of the final flour composition desired. Accordingly, as per the Examples, the amount of fiber present in the final product can range anywhere from approximately 40.5 g to 299.4 g, while the amount of protein can range anywhere from about 52.8 g to 721 g. These ranges, however, are merely representative and may vary depending upon the amount of carbohydrate present in the particular additive, such as the protein component to be offset by the fiber content, so as to produce the desired final 0-net carbohydrate flour.

"Net Carbs" as referred to herein represents the total amount of carbohydrates in a particular food that can be absorbed and digested in the intestinal tract. The calculation of net carbs excludes dietary fiber which cannot be digested. Sugar alcohols contain carbs that, too, are not completely absorbed or digested and thus are accordingly also excluded from the final calculation of the 0-net carbohydrate content.

As used herein, "0-net carbohydrate" means the value of the net carbs in ⅛ or ¼ cup of flour or other food is about zero or below zero.

The standard, recognized and accepted method for calculating the net carbohydrate content of carbs in a food product by those skilled in the culinary arts is to subtract the dietary fiber and sugar alcohol content from the total carbohydrate content.

EXAMPLES

The following examples are intended to illustrate, but not limit, the product and process of the present invention. All of the examples below produce a high protein, high fiber 0-net carbohydrate all-purpose baking flour excluding unhealthy fats and unwanted calories.

Example 1

Utilizing a standard food processor grind separately for about 2 minutes ¼ cup (15 g) of wheat bran, 2½ tbs. (45 g) of flax seed meal, 1 tbs. (7.5 g) psyllium husk fiber and 2 tbs. (30 g) hemp protein to a fine grain powder to a granular size of about 240 microns or less (Step 1). Next, combine separately ⅛ cup (13.12 g) 100% natural whey protein powder, 1 tbs. (7 g) all natural 100% vegetarian egg substitute and ¼ cup (26 g) 100% egg white protein. The egg substitute is made from whole soy flour, wheat protein, corn syrup solids and algin. Mix the ingredients for about two minutes in a high speed mixer (Step 2). Combine the processed ingredients of Step 1 with the blended ingredients of Step 2 at a high speed for about three minutes or until fully blended to produce a batch total of approximately 1⅛ cups of a 0-net carbohydrate all-purpose flour.

The resulting 0-net carbohydrate baking flour is set forth in the following recipe formulation.

Example 1

0-net Carbs, High Protein Fused, High Fiber, Low Fat, Reduced Calorie, All Purpose Flour

| FLOUR INGREDIENTS | | | | | | | | | | | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar | Sugar Alcohol | Protein | Sodium |
| 0.52 oz./15 g | ¼ cup | Wheat Bran | 30 | 5.25 g | 0 g | 0 mg | 10 g | 6 g | 0 g | 0 g | 2 g | 0 mg |
| 1.25 oz./45 g | 2½ tbs | Flax Seed Meal | 90 | 6 g | 1 g | 0 mg | 6 g | 4 g | 0 g | 0 g | 4 g | 6 mg |
| 0.25 oz./7 g | 1 tbs | Egg Substitute | 30 | 4 g | 0 g | 0 mg | 8 g | 4 g | 4 g | 0 g | 3 g | 80 mg |
| 0.23 oz./7.5 g | 1 tbs | Psyllium Fiber | 60 | 0 g | 0 g | 0 mg | 0 g | 22.5 g | 0 g | 0 g | 0 g | 8 mg |
| 1.0 oz./30 g | 2 tbs | Hemp Protein | 50 | 1 g | 0 g | 0 mg | 4 g | 4 g | 0 g | 0 g | 7 g | 0 mg |
| 0.46 oz./13.12 g | ⅛ cup | Whey Protein | 112 | 0 g | 0 g | 67 mg | 1 g | 0 g | 0 g | 0 g | 20.8 g | 56 mg |
| 0.9 oz./26 g | ¼ cup | Egg White Protein | 75 | 0 g | 0 g | 0 g | 0.9 g | 0 g | 0 g | 0 g | 16 g | 250 mg |
| 4.6 oz./142.1 g Batch Total | 1 ⅛ Cups | 0-net carb flour | 447 | 16.25 g | 1 g | 67 mg | 29.9 g | 40.5 g | 4 g | 0 g | 52.8 g | 400 mg |
| .45 g/15.79 F.D.A. Serving Size | ⅛ cup | 0-net carb flour | 49.66 | 1.80 | .11 g | 7.4 mg | 3.32 g | 4.5 g | .44 g | 0 g | 5.86 g | 44.4 mg |

F.D.A. One Serving Size Results: 3.32 g Carbs + .44 g Sugar − 4.5 g Fiber = Negative (−) 0.74 g Carbs = 0-Net Carbohydrate Example 2

According to the process steps of Example 1, grind ½ cup (30 g.) of wheat bran, 1 cup (160 g) of sesame flour made from white sesame seed and ¾ cup (84.7 g.) psyllium fiber in a food processor, to a fine particle size of about 236 microns (Step 1). Next, blend ½ cup (78.7 g) whey protein, 1 cup (132 g) almond flour, ¾ cup (78 g) egg white protein and ¼ cup (40.5 g) vital wheat gluten in a high speed mixer (Step 2). Mix the processed ingredients (Step 1) with the blend from the high speed mixer (Step 2) to produce a batch total of 4¾ cups of a high protein 0-net carbohydrate flour. As stated above, gluten is the protein found in wheat.

The 0-net carbohydrate baking flour of Example 2 is illustrated in the following recipe formulation.

Example 2

0-net Carbs, High Protein Fused, High Fiber, Low Fat, Reduced Calorie, All Purpose Flour larger particle size slightly in excess of 240 microns. The whey protein, vital wheat gluten, almond flour and egg white protein are blended together for at least three minutes or until fully blended. The final mixing of all the ingredients produces the multi-purpose 0-net carbohydrate baking flour.

| FLOUR INGREDIENTS | | | | | | | | | | | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar | Sugar Alcohol | Protein | Sodium |
| 1.05 oz./30 g | ½ cup | Wheat Bran | 60 | 10.5 g | 0 g | 0 mg | 20 g | 12 g | 0 g | 0 g | 4 g | 0 mg |
| 4.4 oz./132 g | 1 cup | Almond Flour | 640 | 56 g | 4 g | 0 mg | 24 g | 12 g | 4 g | 0 g | 24 g | 0 mg |
| 5.6 oz./160 g | 1 cup | Sesame Flour | 1260 | 120 g | 18 g | 0 mg | 30 g | 30 g | 0 g | 0 g | 42 g | 60 mg |
| 2.77 oz./84.7 g | ¾ cup | Psyllium Fiber | 159 | 0 g | 0 g | 0 mg | 47.24 g | 127.2 g | 0 g | 0 g | 0 g | 79.5 mg |
| 1.42 oz./40.5 g | ¼ cup | Vital Wheat Protein | 120 | 1 g | 0 g | 0 mg | 6 g | 0 g | 0 g | 0 g | 23 g | 0 mg |
| 2.77 oz./78.7 g | ¾ cup | Whey Protein | 672 | 0 g | 0 g | 402 mg | 6 g | 0 g | 0 g | 0 g | 124.8 g | 336 mg |
| 2.70 oz./78.0 g | ¾ cup | Egg White Protein | 225 | 0 g | 0 g | 0 g | 2.7 g | 0 g | 0 g | 0 g | 48 g | 475.5 mg |
| 19.89 oz./506.4 g Batch Total | 4¾ cups | 0-net carb flour | 3136 | 178.8 g | 22 g | 402 mg | 129.94 g | 181.2 g | 4 g | 0 g | 265.8 g | 1029 mg |
| .52 oz./13.32 g F.D.A. Serving Size | ⅛ cup | 0-net carb flour | 82.52 | 4.68 g | .57 g | 10.57 mg | 3.41 g | 4.76 g | .10 g | 0 g | 6.99 g | 27.07 mg |

F.D.A. One Serving Size Results: 3.41 g Carbs + .10 g sugar − 4.76 g Fiber = Negative (−) 1.09 g Carbs = 0-net carbohydrate

Example 3

The process of Example 2 is repeated utilizing the same ingredients, but changing the quantities of the ingredients by increasing the wheat bran to 1 cup (60 g), decreasing the almond flour to ½ cup (66 g), decreasing the sesame flour to ½ cup (80 g), increasing the vital wheat gluten to ½ cup (74.7 g) and increasing the egg white protein to 1 cup (104 g). The wheat bran, psyllium fiber and sesame flour are ground at a medium grind setting in a commercial grain mill to a slightly The 0-net carbohydrate flour produced is represented by the following recipe formulation.

Example 3

0-net Carbs, High Protein Fused, High Fiber, Low Fat, Reduced Calorie, All Purpose Flour

| FLOUR INGREDIENTS | | | | | | | | | | | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar | Sugar Alcohol | Protein | Sodium |
| 2.1 oz./60 g | 1 cup | Wheat Bran | 120 | 21 g | 0 g | 0 mg | 40 g | 24 g | 0 g | 0 g | 8 g | 0 mg |
| 2.2 oz./66 g | ½ cup | Almond Flour | 320 | 28 g | 2 g | 0 mg | 12 g | 6 g | 2 g | 0 g | 12 g | 0 mg |
| 2.8 oz./80 g | ½ cup | Sesame Flour | 630 | 60 g | 9 g | 0 mg | 15 g | 15 g | 0 g | 0 g | 21 g | 30 g |
| 2.77 oz./84.7 g | ¾ cup | Psyllium Fiber | 159 | 0 g | 0 g | 0 mg | 47.24 g | 127.2 g | 0 g | 0 g | 0 g | 79.5 mg |
| 2.63 oz./74.7 g | ½ cup | Vital Wheat Protein | 240 | 2 g | 0 g | 0 mg | 12 g | 0 g | 0 g | 0 g | 46 g | 0 mg |
| 2.77 oz./78.7 g | ¾ cup | Whey Protein | 672 | 0 g | 7.8 g | 402 mg | 6 g | 0 g | 0 g | 0 g | 124.8 g | 336 mg |
| 3.60 oz./104 g | 1 cup | Egg White Protein | 360 | 0 g | 0 g | 0 g | 3.6 g | 0 g | 0 g | 0 g | 64 g | 0 mg |
| 18.87 oz./547 g Batch Total | 5 cups | 0-net carb flour | 2552 | 111 g | 18.8 g | 402 mg | 151.6 g | 171 g | 2 g | 0 g | 275 g | 422 mg |
| .52 oz./13.32 g F.D.A. Serving Size | ⅛ cup | 0-net carb flour | 63.80 | 2.77 | .27 g | 10.05 mg | 3.79 g | 4.27 g | .05 g | 0 g | 6.87 g | 10.55 mg |

F.D.A. One Serving Size Results: 3.79 g Carbs + .05 g sugar − 4.27 g Fiber = Negative (−) .43 g Carbs = 0-net carbohydrate

Example 4

Following the procedure of Example 3, the psyllium fiber is increased to 1 cup (113 g), the vital wheat gluten is increased to 1 cup (149.4 g), and the whey protein is increased to 1 cup (105 g). The wheat bran, psyllium fiber and sesame flour are, in this example, once again processed at a fine grind setting. The combined blend of proteins and fibers are mixed at high speed for approximately four minutes to produce the 0-net carbohydrate flour.

The high protein, high fiber 0-net carbohydrate baking flour produced is represented by the following recipe formulation.

Example 4

0-net Carbs, High Protein Fused, High Fiber, Low Fat, Reduced Calorie, All Purpose Flour

| Weight Ounces Grams | Batch Qty. | Raw Materials | Total Calorie | Total Fat | Sat. Fat | Cholest. | Total Carbs | Fiber | Sugar | Sugar Alcohol | Protein | Sodium |
|---|---|---|---|---|---|---|---|---|---|---|---|---|
| 2.1 oz./60 g | 1 cup | Wheat Bran | 120 | 21 g | 0 g | 0 mg | 40 g | 24 g | 0 g | 0 g | 8 g | 0 mg |
| 2.2 oz./66 g | ½ cup | Almond Flour | 320 | 28 g | 2 g | 0 mg | 12 g | 6 g | 2 g | 0 g | 12 g | 0 mg |
| 2.8 oz./80 g | ½ cup | Sesame Flour | 630 | 60 g | 9 g | 0 mg | 15 g | 15 g | 0 g | 0 g | 21 g | 30 mg |
| 3.9 oz./113 g | 1 cup | Psyllium Fiber | 212 | 0 g | 0 g | 0 mg | 63 g | 169.6 g | 0 g | 0 g | 0 g | 106 mg |
| 5.26 oz./149.4 g | 1 cup | Vital Wheat Protein | 480 | 4 g | 0 g | 0 mg | 24 g | 0 g | 0 g | 0 g | 92 g | 0 mg |
| 3.7 oz./105 g | 1 cup | Whey Protein | 904 | 0 g | 0 g | 536 mg | 8 g | 0 g | 0 g | 0 g | 208 g | 376 mg |
| 3.6 oz./104 g | 1 cup | Egg White Protein | 360 | 0 g | 0 g | 0 g | 3.6 g | 0 g | 0 g | 0 g | 64 g | 1200 mg |
| 23.56 oz./678 g Batch Total | 6 cups | 0-net carb flour | 3026 | 113 g | 11 g | 536 mg | 165.6 g | 214.6 g | 2 g | 0 g | 405 g | 1682 mg |
| .46 oz./14.12 g F.D.A. Serving Size | ⅛ cup | 0-net carb flour | 63.04 | 2.35 | .22 g | 10.05 mg | 3.45 g | 4.47 g | .04 g | 0 g | 8.43 g | 35.04 mg |

F.D.A. One Serving Size Results: 3.45 g Carbs + .04 g sugar − 4.47 g Fiber = Negative (−) .98 g Carbs = 0-net carbohydrate

Example 5

The procedure of Example 4 is repeated, with the exception that the vital wheat gluten content is increased to 1½ cups (224.1 g). The 0-net carbohydrate baking flour produced is set forth by the following recipe formulation.

Example 5

0-net Carbs, High Protein Fused, High Fiber, Low Fat, Reduced Calorie, All Purpose Flour

| Weight Ounces Grams | Batch Qty. | Raw Materials | Total Calorie | Total Fat | Sat. Fat | Cholest. | Total Carbs | Fiber | Sugar | Sugar Alcohol | Protein | Sodium |
|---|---|---|---|---|---|---|---|---|---|---|---|---|
| 2.1 oz./60 g | 1 cup | Wheat Bran | 120 | 21 g | 0 g | 0 mg | 40 g | 24 g | 0 g | 0 g | 8 g | 0 mg |
| 2.2 oz./66 g | ½ cup | Almond Flour | 320 | 28 g | 2 g | 0 mg | 12 g | 6 g | 2 g | 0 g | 12 g | 0 mg |
| 2.8 oz./80 g | ½ cup | Sesame Flour | 630 | 60 g | 9 g | 0 mg | 15 g | 15 g | 0 g | 0 g | 21 g | 30 mg |
| 3.9 oz./113 g | 1 cup | Psyllium Fiber | 212 | 0 g | 0 g | 0 mg | 63 g | 169.6 g | 0 g | 0 g | 0 g | 106 mg |
| 7.89 oz./224.1 g | 1½ cup | Vital Wheat Protein | 720 | 6 g | 0 g | 0 mg | 36 g | 0 g | 0 g | 0 g | 138 g | 0 mg |
| 3.7 oz./105 g | 1 cup | Whey Protein | 904 | 0 g | 0 g | 536 mg | 8 g | 0 g | 0 g | 0 g | 208 g | 376 mg |
| 3.6 oz./104 g | 1 cup | Egg White Protein | 360 | 0 g | 0 g | 0 mg | 3.6 g | 0 g | 0 g | 0 g | 64 g | 1200 mg |

-continued

| | | | | | | | | | | Sugar | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar | Alcohol | Protein | Sodium |
| 26.1 oz./752.1 g Batch Total | 6½ cups | 0-net carb flour | 3266 | 115 g | 11 g | 536 mg | 177.6 g | 214.6 g | 2 g | 0 g | 451 g | 1682 mg |
| .46 oz./14.12 g F.D.A. Serving Size | ⅛ cup | 0-net carb flour | 62.80 | 2.21 g | .21 g | 10.30 mg | 3.41 g | 4.12 g | .03 g | 0 g | 8.63 g | 32.34 mg |

F.D.A. One Serving Size Results: 3.41 g Carbs + .03 g sugar − 4.12 g Fiber = Negative (−) .68 Carbs = 0-net carbohydrate

Example 6

The procedure of Example 5 is repeated, with the exception of increasing the content of vital wheat gluten to 2 cups (298.8 g) and increasing the content of psyllium fiber to 1½ cups (169.5 g). Also, the two step process is eliminated and all of the ingredients are milled/ground together at a fine mill setting to produce the 0-net carbohydrate flour.

The resulting 0-net carbohydrate baking flour is represented by the following recipe formulation.

Example 6

0-net Carbs, High Protein Fused, High Fiber, Low Fat, Reduced Calorie, All Purpose Flour

FLOUR INGREDIENTS

| Weight Ounces Grams | Batch Qty. | Raw Materials | Total Calorie | Total Fat | Sat. Fat | Cholest. | Total Carbs | Fiber | Sugar | Sugar Alcohol | Protein | Sodium |
|---|---|---|---|---|---|---|---|---|---|---|---|---|
| 2.1 oz./60 g | 1 cup | Wheat Bran | 120 | 21 g | 0 g | 0 mg | 40 g | 24 g | 0 g | 0 g | 8 g | 0 mg |
| 2.2 oz./66 g | ½ cup | Almond Flour | 320 | 28 g | 2 g | 0 mg | 12 g | 6 g | 2 g | 0 g | 12 g | 0 mg |
| 2.8 oz./80 g | ½ cup | Sesame Flour | 630 | 60 g | 9 g | 0 mg | 15 g | 15 g | 0 g | 0 g | 21 g | 30 mg |
| 5.85 oz./169.5 g | 1½ cups | Psyllium Fiber | 318 | 0 g | 0 g | 0 mg | 94.5 g | 254.4 g | 0 g | 0 g | 0 g | 159 mg |
| 10.52 oz./298.8 g | 2 cups | Vital Wheat Protein | 960 | 8 g | 0 g | 0 mg | 48 g | 0 g | 0 g | 0 g | 184 g | 0 mg |
| 3.7 oz./105 g | 1 cup | Whey Protein | 904 | 0 g | 0 g | 536 mg | 8 g | 0 g | 0 g | 0 g | 208 g | 376 mg |
| 3.6 oz./104 g | 1 cup | Egg White Protein | 360 | 0 g | 0 g | 0 g | 3.6 g | 0 g | 0 g | 0 g | 64 g | 1200 mg |
| 30.77 oz./883.3 g Batch Total | 7½ cups | 0-net carb flour | 3612 | 117 g | 11 g | 536 mg | 221.1 g | 299.4 g | 2 g | 0 g | 497 g | 1765 mg |
| .51 oz./14.72 g F.D.A. Serving Size | ⅛ cup | 0-net carb flour | 60.20 | 1.95 g | .18 g | 8.93 mg | 3.68 g | 4.99 g | .03 g | 0 g | 8.28 g | 29.41 mg |

F.D.A. One Serving Size Results: 3.68 g Carbs + .03 g sugar − 4.99 g Fiber = Negative (−) 1.28 g Carbs = 0-net carbohydrate

Example 7

Utilizing a commercial grade food processor, grind at a fine mill setting (approximately 212-240 microns) until fully ground, the mixture of 1 cup wheat bran, 1 cup of psyllium fiber, 3 cups vital wheat protein, 1 cup (105 g) whey protein, 1 cup (104 g) egg white protein and ¼ cup (56 g) sugar alcohol crystals for a batch total of 7¼ cups, of a high protein 0-net carbohydrate all-purpose flour. The two step process is once again eliminated.

The resulting 0-net carbohydrate baking flour is set forth in the following recipe formulation.

Example 7

0-net Carbs, High Protein Fused, High Fiber, Low Fat, Reduced Calorie, All Purpose Flour

| | | FLOUR INGREDIENTS | | | | | | | | | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
| 2.1 oz./60 g | 1 Cup | Wheat Bran | 120 | 21 g | 0 g | 0 mg | 40 g | 24 g | 0 g | 0 g | 8 g | 0 mg |
| 3.9 oz./113 g | 1 Cup | Psyllium Fiber | 212 | 0 g | 0 g | 0 mg | 63 g | 169.6 g | 0 g | 0 g | 0 g | 106 mg |
| 15.78 oz./448 g | 3 Cups | Vital Wheat Protein | 1440 | 6 g | 0 g | 0 mg | 72 g | 0 g | 0 g | 0 g | 276 g | 0 mg |
| 3.7 oz./105 g | 1 Cup | Whey Protein | 904 | 0 g | 0 g | 536 mg | 8 g | 0 g | 0 g | 0 g | 208 g | 376 mg |
| 3.6 oz./104 g | 1 Cup | Egg White Protein | 360 | 0 g | 0 g | 0 mg | 0 g | 0 g | 0 g | 0 g | 80 g | 1200 mg |
| 2 oz./56 g | ¼ Cup | Xylitol (Sugar Alcohol) | 120 | 0 g | 0 g | 0 g | 30 g | 0 g | 48 g | 0 g | 0 g | 0 mg |
| 31.08 oz./886.2 g Batch Total | 7½ Cups | 0-net carb flour | 3156 | 27 g | 0 g | 536 mg | 213 g | 194.9 g | 48 g | 0 g | 572 g | 1698 mg |
| .53 oz./15.27 g F.D.A. Serving Size | ⅛ Cup | 0-net carb flour | 54.41 | .46 g | 0 g | 9.2 mg | 3.67 g | 3.24 g | .82 g | 0 g | 9086 g | 29 mg |

F.D.A. ⅛ Cup, One Serving Size Results: 3.67 g Carbohydrate − 3.24 g Fiber − .82 g Sugar Alcohol = Negative (−) .39 g Net Carbohydrates = 0-net carbohydrate

Example 8

In a high speed mixer, blend together for about two minutes, 1 cup (113 g) of a psyllium fiber/psyllium husk fiber, 1 cup (60 g) of wheat bran, 1 cup (105 g.) of 100% whey protein powder, 1 cup (104 g) of 100% egg white protein powder and ½ tsp. of xanthan gum bonding agent. The resulting blend of fibers and proteins is ground in a commercial grade grain mill set on a fine mill setting (approximately 212-236 microns) until fully ground so as to bind the proteins to the fibers as a finely milled powder. Next, grind in a commercial grade food processor, set on a fine setting, ¼ cup (56 g) of a sugar alcohol crystal (#4 on the glycemic index scale) to a fine powder. In a high speed mixer, blend together for about 3 minutes, or until fully blended, the above protein bonded fibers with 3¼ cups (486 g) of a 100% vital wheat gluten and ¼ cup (56 g) of the powdered sugar alcohol crystals to produce a 0-net carbohydrate all-purpose baking flour.

The resulting 0-net carbohydrate all-purpose flour is set forth in the following recipe formulation.

Example 8

0-net Carbs, High Protein Fused, High Fiber, Low Fat, Reduced Calorie, All Purpose Flour

| | | FLOUR INGREDIENTS | | | | | | | | | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
| 2.1 oz./60 g | 1 Cup | Wheat Bran | 120 | 21 g | 0 g | 0 mg | 40 g | 24 g | 0 g | 0 g | 8 g | 0 mg |
| 3.9 oz./113 g | 1 Cup | Psyllium Fiber | 212 | 0 g | 0 g | 0 mg | 63 g | 169.6 g | 0 g | 0 g | 0 g | 106 mg |
| 17.1 oz./486 g | 3¼ Cup | Vital Wheat Protein | 1560 | 6.5 g | 0 g | 0 mg | 78 g | 0 g | 0 g | 0 g | 299 g | 0 mg |
| 3.7 oz./105 g | 1 Cup | Whey Protein | 904 | 0 g | 0 g | 536 mg | 8 g | 0 g | 0 g | 0 g | 208 g | 376 mg |
| 3.6 oz./104 g | 1 Cup | Egg White Protein | 360 | 0 g | 0 g | 0 mg | 0 g | 0 g | 0 g | 0 g | 80 g | 1200 mg |
| 2 oz./56 g | ¼ Cup | Xylitol (Sugar Alcohol) | 120 | 0 g | 0 g | 0 g | 30 g | 0 g | 48 g | 0 g | 0 g | 0 mg |
| .03 oz./2 g | ½ TSP | Xanthan Gum | 6 | 0 g | 0 g | 0 mg | 1.3 g | 1.3 g | 0 g | 0 g | 0 g | 16 mg |
| 31.08 oz./886.2 g Batch Total | 7½ Cups | 0-net carb flour | 3156 | 27.5 g | 0 g | 536 mg | 220.3 g | 194.9 g | 48 g | 0 g | 595 g | 1698 mg |

-continued

FLOUR INGREDIENTS

| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
|---|---|---|---|---|---|---|---|---|---|---|---|---|
| .53 oz./ 15.27 g F.D.A. Serving Size | ⅛ Cup | 0-net carb flour | 54.41 | .45 g | 0 g | 8.9 mg | 3.67 g | 3.24 g | .80 g | 0 g | 9.91 g | 28.3 mg |

F.D.A. ⅛ Cup, One Serving Size Results: 3.67 g Carbohydrate − 3.24 g Fiber − .80 g Sugar Alcohol = Negative (−) .37 g Net Carbohydrates = 0-net carbohydrate Example 9

In a high speed mixer, blend together for about two minutes, 1 cup (113 g) of psyllium fiber/psyllium husk fiber, 1 cup (76 g) of raw corn bran, 2 cups (210 g) of 100% whey protein powder and ½ tsp. of guar gum as a bonding agent. In a commercial grade grain mill, set on a fine mill setting, grind/ bond the mixed ingredients (1 protein, 2 fibers and guar gum) to approximately 212-236 microns. In a commercial grade food processor, grind at a fine setting, ¼ cup (56 g) of sugar alcohol crystals to a fine powder. In a high speed mixer, blend together for at least three minutes, or until fully blended, 3¼ cups (486 g) of 100% vital wheat gluten, the 4 cups (392 g) of the bonded psyllium fiber, corn bran and whey protein powder, and the ¼ cup of sugar alcohol crystals to produce a 0-net carbohydrate flour.

The resulting high protein 0-net carbohydrate baking flour is represented in the following recipe formulation.

Example 9

0-net Carbs, High Protein Fused, High Fiber, Low Fat, Reduced Calorie, All Purpose Flour

FLOUR INGREDIENTS

| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
|---|---|---|---|---|---|---|---|---|---|---|---|---|
| 2.28 oz./67 g | 1 Cup | Corn Bran (Raw) | 170 | 1 g | 0 g | 0 mg | 65 g | 60 g | 0 g | 0 g | 6 g | 5 mg |
| 3.9 oz./113 g | 1 Cup | Psyllium Fiber | 212 | 0 g | 0 g | 0 mg | 63 g | 169.6 g | 0 g | 0 g | 0 g | 106 mg |
| 17.1 oz./486 g | 3¼ Cup | Vital Wheat Protein | 1560 | 6.5 g | 0 g | 0 mg | 78 g | 0 g | 0 g | 0 g | 299 g | 0 mg |
| 7.4 oz./210 g | 2 Cups | Whey Protein | 18.8 | 0 g | 0 g | 1072 mg | 16 g | 0 g | 0 g | 0 g | 416 g | 752 mg |
| 2 oz./56 g | ¼ Cup | Xylitol (Sugar Alcohol) | 120 | 0 g | 0 g | 0 g | 30 g | 0 g | 48 g | 0 g | 0 g | 0 mg |
| .03 oz./2 g | ½ TSP | Guar Gum (Binder) | 5 | 0 g | 0 g | 0 g | 1 g | 1 g | 0 g | 0 g | 0 g | 0 mg |
| 32.71 oz./943 g Batch Total | 7½ Cups | 0-net carb flour | 3875 | 7.5 g | 0 g | 536 mg | 253 g | 230.6 g | 48 g | 0 g | 721 g | 863 mg |
| .54 oz./15.71 g F.D.A. Serving Size | ⅛ Cup | 0-net carb flour | 64.58 | .12 g | 0 g | 8.9 mg | 4.21 g | 3.84 g | .80 g | 0 g | 12.01 g | 14.35 mg |

F.D.A. ⅛ Cup, One Serving Size Results: 4.21 g Carbohydrate − 3.84 g Fiber − .80 g Sugar Alcohol = Negative (−) .43 g Net Carbohydrates = 0-net carbohydrate Example 10

In a high speed mixer, blend together for about two minutes, ½ cup (56.5 g) of psyllium fiber/psyllium husk fiber, 1 cup (60 g) of wheat bran, 2 cups (210 g) of 100% whey protein powder, 1 cup (114 g) textured vegetable protein (TVP) and ½ tsp. of xanthan gum bonding agent. Grind/bond all of the above mixed ingredients to approximately 212-236 microns in a commercial grade grain mill, set on a fine mill setting. This process infused the proteins to the fibers at a molecular level as a finely milled powder. In a commercial grade food processor, grind at a fine setting, ½ cup (96 g) erythritol crystals to a fine powder. Finally, in a high speed mixer, blend together for about three minutes or until fully blended, 3¼ cups (486 g) of 100% vital wheat gluten, ½ cup (96 g) of the powdered erythritol crystals and the above 4½ cups of the finely milled powder of the protein infused fibers. This final blend produces a 0-net carbohydrate all-purpose flour.

The resulting 0-net carbohydrate baking flour is set forth as the following formulation.

Example 10

0-Net Carbs, High Protein Fused, High Fiber, Low Fat, Reduced Calorie, All Purpose Flour

| | | | FLOUR INGREDIENTS | | | | | | | | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
| 2.1 oz./60 g | 1 Cup | Wheat Bran | 120 | 21 g | 0 g | 0 mg | 40 g | 24 g | 0 g | 0 g | 8 g | 0 mg |
| 1.95 oz./56.5 g | ½ Cup | Psyllium Husk Fiber | 1.6 | 0 g | 0 g | 0 mg | 31.5 g | 84.8 g | 0 g | 0 g | 0 g | 53 mg |
| 17.1 oz./486 g | 3¼ Cup | Vital Wheat Protein | 1560 | 6.5 g | 0 g | 0 mg | 78 g | 0 g | 0 g | 0 g | 299 g | 0 mg |
| 7.4 oz./210 g | 2 Cups | Whey Protein | 812 | 0 g | 0 g | 288 mg | 12.5 g | 0 g | 0 g | 12.5 g | 162.8 g | 288 mg |
| 4.0 oz./114 g | 1 Cup | Textured Vegetable Protein | 600 | 8 g | 0 g | 0 mg | 28 g | 16 g | 0 g | 0 g | 52 g | 53 mg |
| 4 oz./96 g | ¼ Cup | Erythritol (Sugar Alcohol) | 0 | 0 g | 0 g | 0 g | 30 g | 0 g | 112 g | 0 g | 0 g | 0 mg |
| .03 oz./2 g | ½ TSP | Xanthan Gum (Binder) | 6 | 0 g | 0 g | 0 g | 1.3 g | 1.3 g | 0 g | 0 g | 0 g | 16 mg |
| 36.58 oz./1024 g Batch Total | 8½ Cups | 0-net carb flour | 3204 | 35.5 g | 0 g | 288 mg | 191.3 g | 126.1 g | 112 g | 20.5 g | 521.8 g | 410 mg |
| .57 oz./16 g F.D.A. Serving Size | ⅛ Cup | 0-net carb flour | 50.06 | .55 g | 0 g | 4.5 mg | 2.98 g | 1.97 g | 1.75 g | .32 g | 8.15 g | 6.04 mg |

F.D.A. ⅛ Cup, One Serving Size Results: 2.98 g Carbohydrate − .32 Sugar − 1.97 g Fiber − 1.75 g Sugar Alcohol = Negative (−) .42 g Net Carbohydrates = 0-net carbohydrate

Example 11

The process of Example 10 is replicated with the following substitutions. Corn bran replaces the wheat bran; soy flour replaces the vital wheat gluten, and soy protein replaces the TVP. The amount of sugar alcohol (erythritol) is reduced to ⅓ cup. The resulting flour is a 0-net carbohydrate gluten free all-purpose baking flour represented by the following formulation.

Example 11

0-net Carbs, High Protein Fused, High Fiber, Low Fat, Reduced Calorie, All Purpose Flour

| | | | FLOUR INGREDIENTS | | | | | | | | | |
|---|---|---|---|---|---|---|---|---|---|---|---|---|
| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
| 2.6 oz./76g | 1 Cup | Corn Bran | 170 | 1 g | 0 g | 0 mg | 65 g | 60 g | 0 g | 0 g | 6 g | 5 mg |
| 1.95 oz./56.5 g | ½ Cup | Psyllium Husk Fiber | 106 | 0 g | 0 g | 0 mg | 31.5 g | 84.8 g | 0 g | 0 g | 0 g | 53 mg |
| 10.9 oz./329 g | 3¼ Cup | Soy Flour | 1385 | 25.9 g | 0 g | 288 mg | 86.6 g | 51.9 g | 0 g | 34.6 g | 173 g | 0 mg |
| 7.4 oz./210 g | 2 Cups | Whey Protein | 812 | 0 g | 0 g | 0 mg | 12.5 g | 0 g | 0 g | 12.5 g | 162.8 g | 288 mg |
| 3.2 oz./96 g | 1 Cup | Soy Protein | 320 | 0 g | 0 g | 0 mg | 28 g | 16 g | 0 g | 8 g | 80 g | 960 mg |
| 3 oz/84 g | ⅓ Cup | Erythritol (Sugar Alcohol) | 0 | 0 g | 0 g | 0 g | 0 g | 0 g | 84 g | 0 g | 0 g | 0 mg |

FLOUR INGREDIENTS

| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
|---|---|---|---|---|---|---|---|---|---|---|---|---|
| .03 oz./ 2 g | ½ TSP | Xanthan Gum (Binder) | 6 | 0 g | 0 g | 0 g | 1.3 g | 1.3 g | 0 g | 0 g | 0 g | 16 mg |
| 29.08 oz./ 853 g Batch Total | 8 Cups | 0-net carb flour | 2799 | 26.9 g | 0 g | 288 mg | 196.9 g | 198 g | 84 g | 47.1 g | 421.8 g | 1322 mg |
| .45 oz./ 13.3 g F.D.A. Serving Size | ⅛ Cup | 0-net carb flour | 43.73 | .42 g | 0 g | 4.5 mg | 3.07 g | 3.09 g | 1.31 g | .73 g | 6.59 g | 20.6 mg |

F.D.A. ⅛ Cup, One Serving Size Results: 3.07 g Carbohydrate + .73 g Sugar − 3.09 g Fiber − 1.31 g Sugar Alcohol = Negative (−) .60 g Net Carbohydrates = 0-net carbohydrate

Example 12

The process of Example 11 is repeated but for the following variations. In the final mixing/blending step the amount of the soy flour is reduced to 1⅝ cups, and 1⅝ cups of coconut flour is added to the mix.

The resulting formulation results in a gluten free, 0-net carbohydrate all-purpose baking flour.

Example 12

0-net Carbs, High Protein Fused, High Fiber, Low Fat, Reduced Calorie, All Purpose Flour

FLOUR INGREDIENTS

| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
|---|---|---|---|---|---|---|---|---|---|---|---|---|
| 2.6 oz./76 g | 1 Cup | Corn Bran | 170 | 1 g | 0 g | 0 mg | 65 g | 60 g | 0 g | 0 g | 6 g | 5 mg |
| 1.95 oz./56.5 g | ½ Cup | Psyllium Husk Fiber | 106 | 0 g | 0 g | 0 mg | 31.5 g | 84.8 g | 0 g | 0 g | 0 g | 53 mg |
| 5.45 oz./164.5 g | 1⅝ Cups | Soy Flour | 1385 | 25.9 g | 0 g | 288 mg | 86.6 g | 51.9 g | 0 g | 34.6 g | 173 g | 0 mg |
| 6.5 oz./182 g | 1⅝ Cups | Coconut Flour | | | | | | | | | | |
| 7.4 oz./210 g | 2 Cups | Whey Protein | 812 | 0 g | 0 g | 0 mg | 12.5 g | 0 g | 0 g | 12.5 g | 162.8 g | 288 mg |
| 3.2 oz./96 g | 1 Cup | Soy Protein | 320 | 0 g | 0 g | 0 mg | 28 g | 16 g | 0 g | 8 g | 80 g | 960 mg |
| 3 oz./84 g | ⅓ Cup | Erythritol (Sugar Alcohol) | 0 | 0 g | 0 g | 0 g | 0 g | 0 g | 84 g | 0 g | 0 g | 0 mg |
| .03 oz./2 g | ½ TSP | Xanthan Gum (Binder) | 6 | 0 g | 0 g | 0 g | 1.3 g | 1.3 g | 0 g | 0 g | 0 g | 16 mg |
| 31.13 oz./899 g Batch Total | 8¼ Cups | 0-net carb flour | 2799 | 26.9 g | 0 g | 288 mg | 196.9 g | 198 g | 84 g | 47.1 g | 421.8 g | 1322 mg |
| .45 oz./13.3 g F.D.A. Serving Size | ⅛ Cup | 0-net carb flour | 43.73 | .42 g | 0 g | 4.5 mg | 3.07 g | 3.09 g | 1.31 g | .73 g | 6.59 g | 20.6 mg |

F.D.A. ⅛ Cup, One Serving Size Results: 4.86 g Carbohydrate + .59 g Sugar − 4.15 g Fiber − 1.75 g Sugar Alcohol = Negative (−) .45 g Net Carbohydrates = 0-net carbohydrate

Example 13

Using a high speed commercial mixer, or large volume industrial mixer, blend together for about 2 minutes, 2 cups (120 g) of wheat bran fiber, ½ cup (50 g) flax seed meal, 6 cups (896 g) of vital wheat protein and ½ tsp of Xanthan gum as a bonding agent. Next, utilizing a commercial grade grain mill, set on a fine mill setting, grind so as to bond all of the mixed ingredients to approximately 212-236 microns mill size. The grinding and milling processes infuse the protein and fibers at a molecular level as a finely milled powder thereby preventing the protein from separating in recipes when liquids are added and bonds the balance of the P.O.W.E.R Flour ingredients. Using an industrial grade food processor, grind at a fine setting, ¾ cup (108 g) Sorbitol crystals (sugar alcohol) to a fine powder. Optionally the manufacturer may purchase Sorbitol in powder form. Using a high speed commercial mixer, or large volume industrial mixer, blend together for about 3 minutes, the previously milled ingredients of protein, fiber and bonding agent, with the ¾ cup of powdered Sorbitol.

The result is a 0-net carbohydrate baking flour (P.O.W.E.R. Flour) is represented in the following recipe formulation.

Example 13

P.O.W.E.R. FLOUR™: 0-net Carbs, High Protein Fused, High Fiber, Low Fat, Reduced Calorie, All Purpose Flour

| | | | | | | | | | | | | | |
|---|---|---|---|---|---|---|---|---|---|---|---|---|---|
| | | | FLOUR INGREDIENTS | | | | | | | | | | |
| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
| 4.2 oz./120 g | 2 Cups | Wheat Bran | 240 | 4 g | 0 g | 0 mg | 80 g | 48 g | 0 g | 0 g | 16 g | 0 mg |
| 1.7 oz./50 g | ½ Cup | Flax Seed Meal | 240 | 18 g | 0.5 g | 0 mg | 32 g | 64 g | 0 g | 0 g | 24 g | 0 mg |
| 31.56 oz./896 g | 6 Cups | Vital Wheat Gluten/ Protein | 2880 | 12 g | 0 g | 0 mg | 144 g | 0 g | 0 g | 0 g | 552 g | 0 mg |
| 5 oz./108 g | ¾ Cup | Sorbitol (Sugar Alcohol) | 0 | 0 g | 0 g | 0 mg | 0 g | 0 g | 144 g | 0 g | 0 g | 0 mg |
| .03 oz./2 g | ½ TSP | Xanthan Gum (Binder) | 6 | 0 g | 0 g | 0 mg | 1.3 g | 1.3 g | 0 g | 0 g | 0 g | 16 mg |
| 42.49 oz./1176 g Batch Total | 9 ¼ Cups | P.O.W.E.R. Flour ™ | 3366 | 34 g | 0.5 g | 0 mg | 257.3 g | 113.3 g | 144 g | 0 g | 592 g | 16 mg |
| 1.14 oz./31.78 g U.S.D.A./ F.D.A. | ¼ Cup Serving Size | P.O.W.E.R. Flour ™ | 93.50 | .90 g | .024 g | 0 mg | 6.94 g | 3.06 g | 3.88 g | 0 g | 16.0 g | .44 mg |

F.D.A. ¼ Cup, One Serving Size Results: 6.94 g Carbohydrate − 3.06 g fiber − 3.88 g sugar alcohol = 0-net carbohydrate

Example 14

Using a high speed commercial mixer, or large volume industrial mixer, blend together for about 2 minutes, 1½ cups (300 g) of wheat bran & wheat germ fiber, ½ cup (52 g) flax seed meal, 6 cups (720 g) of vital gluten protein and 1 tsp. of Xanthan gum as a bonding agent. In a commercial grade grain mill, set on a fine mill setting, grind/bond all of the mixed ingredients to approximately 212-236 microns. The milling/grinding process infuses the proteins to the fibers at a molecular level as a finely milled powder. Using an industrial grade food processor, grind at a fine setting, ¼ cup (50 g) Erythritol crystals (sugar alcohol) to a fine powder. In a high speed commercial mixer blend together for about 3 minutes the previously milled fiber, flax seed meal and vital wheat protein and the Xanthan gum bonding agent with the ¼ cup (50 g) of powdered Erythritol.

The resulting 0-net carbohydrate all-purpose baking flour (P.O.W.E.R. Flour) is presented in the following formulation as Table 14.

Example 14

P.O.W.E.R. FLOUR™: 0-net Carbs, High Protein Fused, High Fiber, Low Fat, Reduced Calorie, All Purpose Flour

| | | | | | | | | | | | | | |
|---|---|---|---|---|---|---|---|---|---|---|---|---|---|
| | | | FLOUR INGREDIENTS | | | | | | | | | | |
| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
| 12 oz./300 g | 1½ Cups | Wheat Bran & Wheat Germ | 1020 | 16.6 g | 3.02 g | 0 mg | 189.9 g | 112.5 g | 0 g | .75 g | 50.4 g | 33 mg |
| 4 oz./52 g | ½ Cup | Flax Seed Meal | 240 | 18 g | 0.2 g | 0 mg | 16 g | 16 g | 0 g | 0 g | 12 g | 0 mg |
| 26.4 oz./720 g | 6 Cups | Vital Wheat Gluten/ Protein | 1526 | 0 g | 0 g | 0 mg | 0 g | 172 g | 0 g | 0 g | 576 g | 0 mg |
| 2 oz./50 g | ⅝ Cup | Erythritol (Sugar Alcohol) | 0 | 0 g | 0 g | 0 mg | 0 g | 0 g | 50 g | 0 g | 0 g | 0 mg |
| 06 oz./4 g | 1 TSP | Xanthan Gum (Binder) | 12 | 0 g | 0 g | 0 mg | 2.6 g | 2.6 g | 0 g | 0 g | 0 g | 32 mg |

-continued

FLOUR INGREDIENTS

| Weight Ounces Grams | Batch Qty. | Raw Materials | Total Calorie | Total Fat | Sat. Fat | Cholest. | Total Carbs | Fiber | Sugar Alcohol | Sugar | Protein | Sodium |
|---|---|---|---|---|---|---|---|---|---|---|---|---|
| 44.46 oz./1126 g Batch Total | 8¼ Cups | P.O.W.E.R. Flour ™ | 2798 | 34.6 g | 3.04 g | 0 mg | 208.5 g | 303.16 g | 50 g | .75 g | 638.4 g | 64 mg |
| 1.34 oz./34.12 g U.S.D.A./F.D.A. | ¼ Cup Serving Size | P.O.W.E.R. Flour ™ | 84.78 | 1.04 g | .09 g | 0 mg | 6.31 g | 9.18 g | 1.51 g | .02 g | 19.34 g | 1.93 mg |

F.D.A. ¼ Cup, one serving size results: 6.31 g carbohydrate + .02 g sugar − 9.18 g fiber − 1.51 g sugar alcohol = negative (−)4.36 g carbohydrate = 0-net carbohydrate While the present examples were specific in terms of conditions and materials used, any of the above listed typical materials may be substituted when suitable in the above examples with similar results. Each of the disclosed aspects and embodiments of the present invention may be considered individually or in combination with other aspects, embodiments, and variations of the invention. In addition to the steps used to carry out the process of the present invention, other steps or modifications may be used if desirable. Other materials may be incorporated in the present invention which will further enhance, synergize, or otherwise desirably affect the properties of the final product and process. For example, an emulsifier might be used to further enhance the final result of the process and product.

Anyone skilled in the art will have other modifications occur to them based on the teachings of the present invention. These modifications are intended to be encompassed within the scope of this invention.

The invention claimed is:

1. A process of formulating a 0-net carbohydrate flour comprising a blend of ground raw materials comprising at least one protein and at least one fiber in the presence of a bonding agent, wherein said at least one protein is infused with said at least one fiber, and wherein the flour further comprises a natural sweetener, the process comprising blending together in the presence of said bonding agent milled raw materials comprising said at least one protein and said at least one fiber, and said natural sweetener to produce said 0-net carbohydrate flour, wherein said at least one fiber and said at least one protein are blended together in the presence of a xanthan gum bonding agent such that said at least one protein is infused with said at least one fiber, wherein said at least one protein consists essentially of vital wheat gluten, and wherein said at least one fiber consists essentially of wheat bran and flax seed meal.

2. A process of formulating a 0-net carbohydrate flour comprising a blend of ground raw materials comprising at least one protein and at least one fiber in the presence of a bonding agent, wherein said at least one protein is infused with said at least one fiber, and wherein the flour further comprises a natural sweetener, the process comprising blending together in the presence of said bonding agent milled raw materials comprising said at least one protein and said at least one fiber, and said natural sweetener to produce said 0-net carbohydrate flour, comprising at least one protein and at least one fiber, and a natural sweetener to produce said 0-net carbohydrate flour, wherein said at least one fiber and said at least one protein are blended together in the presence of a xanthan gum bonding agent such that said at least one protein is infused with said at least one fiber, wherein said at least one protein consists essentially of vital wheat gluten, and wherein said at least one fiber consists essentially of flax seed meal and a wheat bran/wheat germ mixture.

* * * * *